United States Patent [19]

Masai

[11] 4,446,952
[45] May 8, 1984

[54] VISCOUS FLUID COUPLING ASSEMBLY

[75] Inventor: Hiroto Masai, Aichi, Japan

[73] Assignee: Aisin Seiki Kabushiki Kaisha, Kariya, Japan

[21] Appl. No.: 319,760

[22] Filed: Nov. 9, 1981

[30] Foreign Application Priority Data

Nov. 10, 1980 [JP] Japan .............................. 55-158634

[51] Int. Cl.³ ...................... F16D 35/00; F16D 43/25
[52] U.S. Cl. .................................. 192/58 B; 192/82 T
[58] Field of Search ............................ 192/58 B, 82 T

[56] References Cited

U.S. PATENT DOCUMENTS

| 3,159,254 | 1/1962 | Weir. | |
|---|---|---|---|
| 3,363,734 | 1/1968 | Sabat | 192/58 B |
| 3,463,282 | 1/1968 | Fujita et al. | |
| 3,587,801 | 6/1971 | Riner | 192/82 T X |
| 3,809,197 | 5/1974 | Clancey | 192/58 B |
| 3,856,122 | 5/1973 | Leichliter | 192/58 B |
| 3,924,716 | 12/1975 | Brewer | 192/82 T X |
| 3,972,399 | 8/1976 | Bopp | 192/58 B |
| 4,060,158 | 11/1977 | Kikuchi | 192/82 T |
| 4,295,550 | 10/1981 | Hayashi | 192/58 B |
| 4,298,111 | 11/1981 | Hayashi | 192/58 B |

FOREIGN PATENT DOCUMENTS 53-38836 4/1978 Japan .............................. 192/58 B Primary Examiner—Rodney H. Bonck
Assistant Examiner—David D. House
Attorney, Agent, or Firm—Sughrue, Mion, Zinn, Macpeak and Seas

[57] ABSTRACT

A viscous fluid coupling assembly is used for driving a cooling fan of automobiles in order to prevent the overcooling of the engine and to reduce the loss of engine power. The assembly comprises an input coupling member driven by an engine, an output coupling member being able to rotate relatively to the input coupling member, a dividing plate dividing the inside of the output coupling member into a reservoir chamber for a viscous fluid and a working chamber, first and second torque transmission surfaces to transmit a torque by means of the viscous fluid, first and second openings, and a thermal responsive valve, thereby controlling the viscous fluid from the reservoir chamber to the working chamber in three steps in response to changes in temperature.

8 Claims, 4 Drawing Figures

VISCOUS FLUID COUPLING ASSEMBLY

BACKGROUND OF THE INVENTION

1. Field of the Invention:

This invention relates to viscous fluid coupling assemblies for use in automobiles in general, and more particularly, to an improvement in a viscous fluid coupling assembly which can control the transmission of the output torque in three steps.

2. Description of the Prior Art:

In a conventional viscous fluid coupling assembly for driving a fan assembly of automobiles, the viscous fluid communication from a reservoir chamber to a working chamber is controlled in response to changes in temperature in order to prevent the overcooling of the engine and to reduce the loss of horsepower. In the conventional assembly, however, a thermal responsive type valve member operates only to open and close a connecting hole between the reservoir chamber and the working chamber. Therefore, the transmission of the output torque can be controlled only in two steps in response to the opening and the closing of the connecting hole. Accordingly, in particular in a temperature range wherein the thermal responsive valve member operates so that the transmission of the output torque is changed from a first condition where a small output torque is transmitted to a second condition where a large output torque is transmitted, the desired cooling function can not be attained or the over-cooling function can be attained. As a result, various disadvantages, such as the increase of the noise and the loss of the horsepower will arise.

In order to obviate the various disadvantages mentioned above, the U.S. Pat. No. 4,298,111, granted Nov. 3, 1981, and assigned to the same assignee as that of the present invention, teaches a viscous fluid coupling assembly which can control the transmission of the output torque in three steps. In this U.S. Patent there is no problem when the transmission of the output torque is controlled in three steps beginning from the condition of non-operation. However, since the pump which brings the viscous fluid contained in the working chamber back to the reservoir chamber is operated by means of the relative rotation between the rotor and the casing, the pump is not operated until the relative rotation between the rotor and the casing increases, even if the opening which supplies the viscous fluid to one of the labyrinths is closed after the viscous fluid is supplied to both labyrinths which are formed in both sides of the rotor in the working chamber. On the other hand, the opening which supplies the viscous fluid to the other labyrinth is open. Since this opening is formed radially outwardly of the above-mentioned closed opening, a large volume of viscous fluid is supplied from the reservoir chamber to the working chamber. Therefore, the viscous fluid can't be pumped rapidly enough from the working chamber back to the reservoir chamber. As a result, a delay in the operation would occur.

SUMMARY OF THE INVENTION

An object of the present invention is to provide a new and improved viscous fluid coupling assembly which obviates the prior disadvantages mentioned above.

More particularly it is an object of the present invention to provide a viscous fluid coupling assembly which can control the output torque in three steps and which can switch the output torque immediately when the valve begins to operate.

Another object of the present invention is to provide a new and improved viscous fluid coupling assembly which is low in cost and is simple in construction.

Other objects, features and advantages of the present invention will become more apparent upon reference to the succeeding detailed description thereof, and to the drawings illustrating a preferred embodiment thereof.

DETAILED DESCRIPTION OF THE PREFERRED EMBODIMENT

Figure 1:
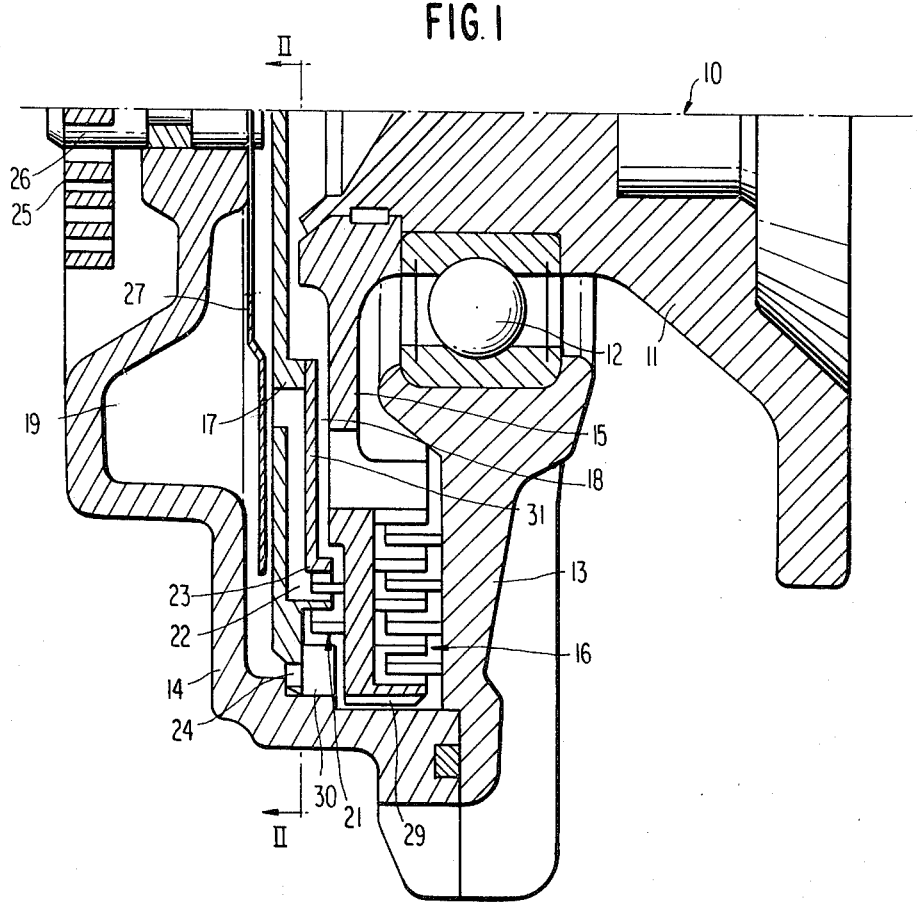
FIG. 1 and FIG. 1A are partial sectional views, taken along line A—A and line B—B of the FIG. 2, respectively, which show a viscous fluid coupling assembly in accordance with the present invention.
Figure 1A:
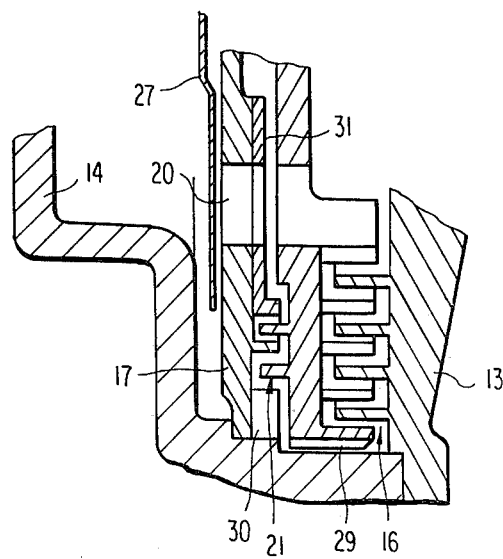

Referring now to FIGS. 1 and 1A which show a partial sectional view of a viscous fluid coupling assembly 10 in accordance with the present invention, the assembly 10 includes a driving shaft or an input coupling member 11 which is driven by an engine of a motorcar, an output coupling member 13 which is rotatably mounted on the input coupling member 1 by means of a bearing means 12, and a casing member 14 which is tightly fixed to the output coupling member 13. A well-known fan assembly is fixed in any convenient manner to the casing member 14 or the output coupling member 13.

The driving shaft 11 securely supports a rotor 15 thereon, having a substantial disk configuration, which is secured to one end of the shaft 11. Between the right side of the rotor 15 and the corresponding side of the output coupling member 13, there is provided a well-known labyrinth means which forms a torque transmission means 16 which transmits the torque from the rotor 15 to the output coupling member 13 during the rotation of the driving shaft 11.

The periphery of a dividing plate 17 is securely fixed to the shoulder of the inside circumference of the casing member 14. The plate 17 divides the inside within the output coupling member 13 and the casing member 14 into a working chamber 18 receiving the rotor 15 therein and a reservoir chamber 19. A viscous fluid, such as a silicon oil, which is contained in the chamber 19 is brought back to the working chamber 18 by means of a first opening 20, shown in FIG. 1A, formed in the dividing plate 17. When the viscous fluid passes through the torque transmission means 16, the viscous fluid produces considerable viscous shearing forces during the rotation of the driving shaft 11. By means of these viscous shearing forces, rotational movement is transmitted from the driving shaft 11 to the output coupling member 13.

Figure 2:
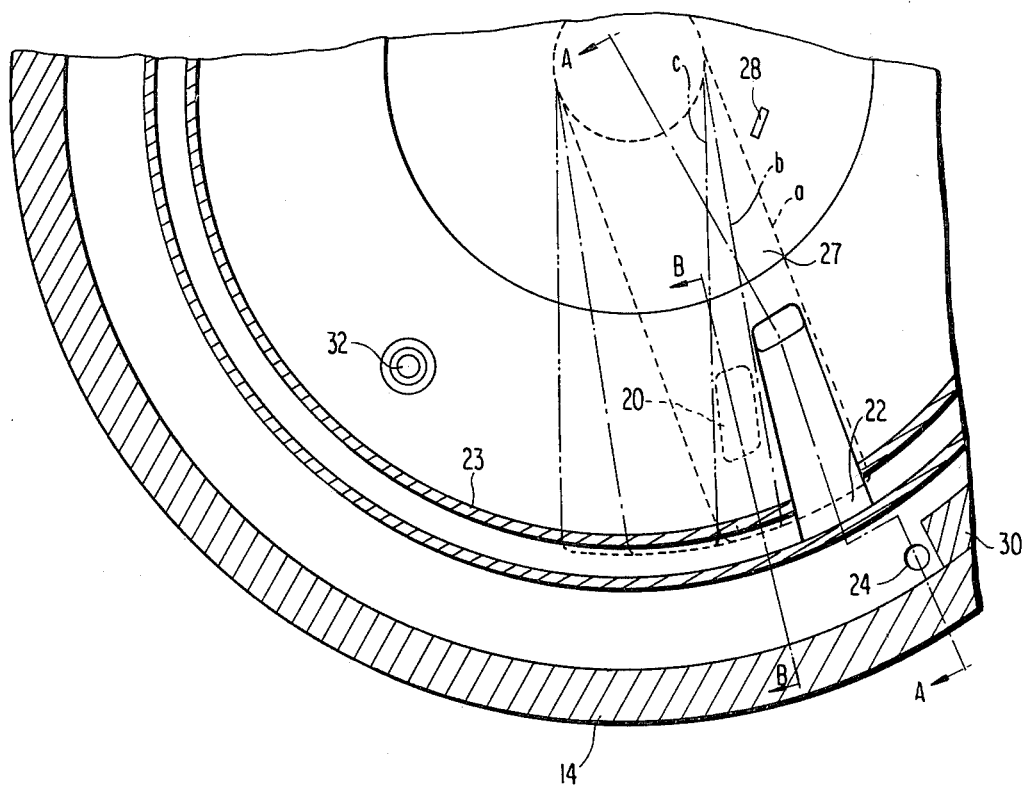
FIG. 2 is a partial sectional view taken along line II—II of the FIG. 1.

Between the right side of the dividing plate 17 and the corresponding left side of the rotor 15, there is provided a further labyrinth means which forms a torque transmission means 21 which is the substantial same construction as that of the above-mentioned torque transmission means 16. Formed in the dividing plate 17 is a second opening 22, shown in FIG. 1A, which is in communication with the reservoir chamber 19 at the point which is positioned more inwardly than the first opening 20, namely at the small radius side, and is in communication with the working chamber 18 at the point which is positioned more outwardly than the first opening 20, namely at the large radius side. The viscous fluid also is brought from the reservoir chamber 19 back to the working chamber 18 by means of the second opening 22. When the viscous fluid passes through the above-mentioned torque transmission means 21, the viscous fluid produces considerable viscous shearing forces during the rotation of the driving shaft 11. By means of these viscous shearing forces, rotational movement is transmitted from the driving shaft 11 to the output coupling member 13. A circular cover plate 31 is fixedly screwed to the dividing plate 17 by fasteners 32, one of which is shown in FIG. 2, in order to form the second opening 22. It is possible to form the cover plate 31 with the dividing plate 17 as one body. An isolating wall 23 which is formed with the cover plate 31 as one body prevents the viscous fluid from reaching the torque transmission means 16 in order that the viscous fluid may reach only the torque transmission means 21 by means of the second opening 22.

Formed on the periphery of the rotor 15 is a screw thread means 29 which co-operates with the casing member 14 and transmits the viscous fluid contained in the working chamber 18 from the torque transmission surface 16 to the torque transmission means 21. On the other hand, on the most outward periphery of the dividing plate 17 there is provided a pumping port 24. At the side of the working chamber 18 of the pumping port 24 there is provided a dam 30 which restrains the viscous fluid transmitted from the screw thread means 29 and presses the viscous fluid to the pumping port 24. The volume of the viscous fluid in the working chamber 18 is determined by the volume which is introduced through the first and second openings 20 and 22 and by the volume which is discharged from the pumping port 24 by means of a pumping device comprising the screw thread means 29, dam 30 and the like. It is also possible to form the dam 30 on the casing member 14, or to form the screw thread means 29 on the casing member 14.

A thermal responsive member such as spiral type bimetallic means 25 is fixed on the casing member 14 at one end thereof and is connected with a rod 26 at the other end thereof, thereby causing the rod 26 to rotate in response to changes in temperature. Thus, a valve member 27 which is fixed on the rod 26 is actuated so as to rotate by means of the rod 26. In particular in FIG. 2, the valve member 27 which is biased by the bimetallic means 25 is usually placed in a position a where both the openings 20 and 22 are closed. When the bimetallic means 25 senses a first determined temperature, the valve member 27 is controlled to be placed by means of the rod 26 in a position b where only the second opening 22 is opened. When the bimetallic means 25 senses a second determined temperature, the valve member 27 is controlled to be placed in a position c where both the openings 20 and 22 are opened. A stopper 28 is formed on the dividing plate 17.

Operation of viscous fluid coupling assembly

Figure 3:
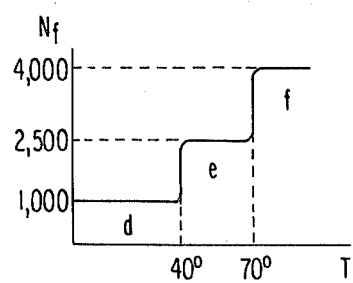
FIG. 3 is a graph of the operation of the viscous fluid coupling assembly.

When the motorcar is running during cold weather, that is to say, when the temperature of the bimetallic means 25 is below the first determined temperature, for example below 40° C., the valve member 27 closes both the openings 20 and 22 by means of the rod 26. As the result, the viscous fluid contained in the working chamber 18 is transmitted to the reservoir chamber 19 by means of the pumping device. The volume of viscous fluid in the working chamber 18 becomes substantially less. Therefore, the rotation of the fan assembly is maintained to be low as shown by the line d in FIG. 3. In the graph of FIG. 3, $N_f$ represents the number of revolutions of the fan and T the temperature sensed by the bimetallic means 25.

When the bimetallic means 25 senses the first determined temperature, the valve member 27 is controlled by the rod 26 to be placed in the position where only the second opening 22 is opened. Under these conditions, as shown by the line e in FIG. 3, the rotation of the fan assembly corresponds to the volume of the viscous fluid which reaches the torque transmission means 21 through the second opening 22. Under these conditions the isolating wall 23 prevents the viscous fluid from reading the torque transmission means 16.

When the bimetallic means 25 senses the second determined temperature, for example 70° C., the valve member 27 is controlled to be placed in the position where both the openings 20 and 22 are opened. Under these conditions, since the viscous fluid reaches both the torque transmission surfaces 16 and 21, the rotation of the fan assembly is controlled to be high as shown by the line f in FIG. 3.

In general, when the load on the vehicle engine is large, the heat generated is also large. The fan assembly for cooling the engine has the capacity to sufficiently cool the engine even when the load on the engine is maximal. Under the condition when both the openings 20 and 22 are opened, the rotation of the fan assembly is high in order that the fan assembly may have enough cooling capacity even during maximal load.

However, the motorcar doesn't always run under the condition of the engine with the maximal load. For example, comprised of goods and the number of the passengers is small, or the motorcar runs on a downward slope, the load on the engine becomes small. In this case, if both the openings 20 and 22 are opened, the engine is overcooled. When the temperature sensed by the bimetallic means 25 becomes below the second determined temperature, for example 70° C., the valve member is controlled to be placed in the position where the first opening 20 is closed and only the second opening 22 is opened. For this reason, the viscous fluid which is supplied from the reservoir chamber 19 to the working chamber 18 is limited to the viscous fluid which exists radially inwardly of the outermost periphery of the point where the second opening 22 is in communication with the reservoir chamber 19. As a result, the volume of the viscous fluid transmitted to the working chamber 18 decreases.

On the other hand, at this time sufficient viscous fluid by which torque transmission can be carried out by means of the torque transmission means 16 and 21 still remains within the working chamber 18. Since the difference in the relative rotation between the rotor 15 and the casing member 14 is very small, the volume of the viscous fluid which is supplied from the working chamber 18 to the reservoir chamber 19 decreases. However, since only the viscous fluid which exists radially inwardly of the outermost periphery of the point where the second opening 22 is in communication with the reservoir chamber 19 is supplied from the reservoir chamber 19 to the working chamber 18, this viscous fluid supplied from the reservoir chamber 19 to the working chamber 18 decreases. As a result, the viscous fluid which exists in the torque transmission means 16 is quickly discharged from the working chamber 18 to the reservoir chamber 19. Therefore, the torque transmission is done by only the torque transmission means 21. That is to say, as shown by the line e in FIG. 3, the rotation of the fan assembly decreases. Thus, the operation of the fluid coupling assembly 10 can reduce the volume of the viscous fluid supplied from the reservoir chamber 19 to the working chamber 18, and can change more quickly from the high speed rotation to the middle speed rotation, than the fan assembly of U.S. Pat. No. 4,298,111 in which the second opening 22 is positioned more outwardly in the radius direction than the closed first opening 20.

From the foregoing it will be apparent that the present invention has provided a fluid coupling assembly which can control the rotation of the fan assembly in three steps in response to the changes in temperature, can attain the desired rotation of the fan assembly in comparison with a conventional fluid coupling assembly which controls the rotation of the fan assembly in two steps, can reduce the noise of the acceleration and the loss of the horsepower, and has a practical advantage that the changing of the operation, in particular the changing from the high-speed rotation to the middle-speed rotation can be quickly done.

Obviously, numerous modifications and variations of the present invention are possible in light of the above teachings. It is therefore to be understood that within the scope of the appended claims, the invention may be practiced otherwise than as specifically described herein.

What is claimed is:

1. A viscous fluid coupling assembly comprising:
   an input coupling member driven by an engine and having a rotating rotor;
   an output coupling member rotatably mounted on said input coupling member;
   a dividing plate connected to said output coupling member and interposed between said rotor and said output coupling member while dividing the inside of said output coupling member into a reservoir chamber for a viscous fluid and a working chamber having said rotor located therein;
   first torque transmission surface means being formed between one side of said rotor and a corresponding side of said output coupling member for transmitting a torque by means of said viscous fluid between said one side of said rotor and said corresponding side of said output coupling member;
   second torque transmission surface means being formed between the other side of said rotor and a corresponding side of said dividing plate for transmitting a torque by means of said viscous fluid between said other side of said rotor and said corresponding side of said dividing plate;
   a first passageway adjacent the outer periphery of said dividing plate for permitting passage of said viscous fluid from said working chamber to said reservoir chamber;
   a first opening being formed in said dividing plate for supplying said viscous fluid to said first and second torque transmission means;
   a second opening formed in said dividing plate in communication on one side of said plate with said reservoir chamber at a point radially inwardly of said first opening and in communication on the other side of said plate with said working chamber at a point radially outwardly of said first opening for supplying said viscous fluid only to said second torque transmission means; and
   thermal responsive means controlling the opening and closing of said first and second openings in response to changes in temperature.

2. A viscous fluid coupling assembly according to claim 1 wherein said first and second torque transmission means are each comprised of labyrinth means.

3. A viscous fluid coupling assembly according to claim 1 wherein a pumping element is provided on said dividing plate adjacent said first passageway.

4. A viscous fluid coupling assembly according to claim 1 wherein said second opening is comprised of a radially extending groove formed in said other side of said dividing plate with an aperture at the radially innermost end of said groove extending through said plate and a cover plate secured to said dividing plate over said groove with an aperture extending through said cover plate in alignment with the radially outermost end of said groove.

5. A viscous fluid coupling assembly as set forth in claim 4 further comprising isolating wall means on said cover plate around said second opening to direct the viscous fluid transmitted from said reservoir chamber to said working chamber through said second opening only to said second torque transmission means.

6. A viscous fluid coupling assembly according to claim 1 wherein said thermal responsive means is a bimetallic means.

7. A viscous fluid coupling assembly according to claim 1 wherein said viscous fluid is a silicon oil.

8. A viscous fluid coupling assembly according to claim 1 wherein said thermal responsive means includes a valve means.

* * * * *